Nov. 5, 1963
M. F. LEVENSON
3,109,192
DEVICE FOR CLEANING TEETH
Filed Aug. 29, 1960
2 Sheets-Sheet 1
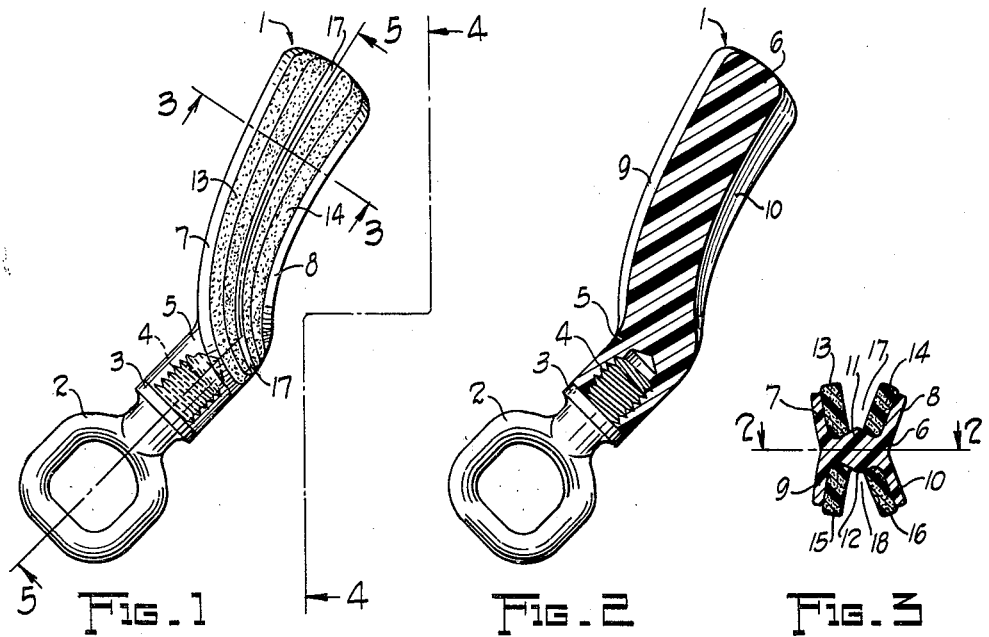
Fig. 1    Fig. 2    Fig. 3
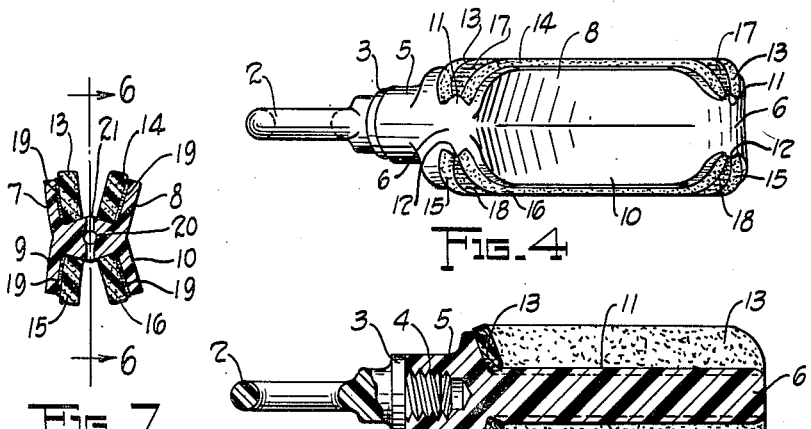
Fig. 7    Fig. 4
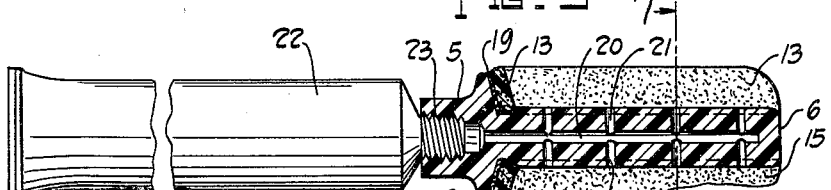
Fig. 5
Fig. 6
INVENTOR.
MYRON F. LEVENSON
BY Bosworth, Sessions,
Herrstrom & Knowles
ATTORNEYS.

Nov. 5, 1963 M. F. LEVENSON 3,109,192
DEVICE FOR CLEANING TEETH
Filed Aug. 29, 1960 2 Sheets-Sheet 2
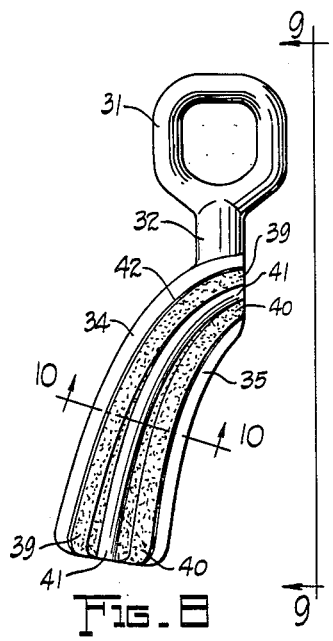
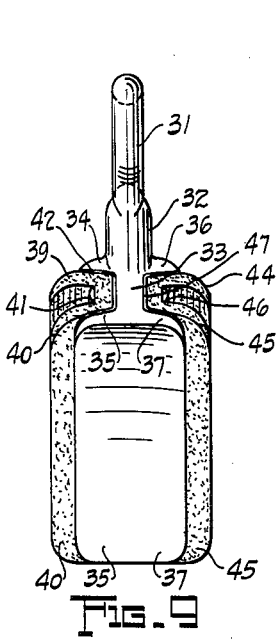
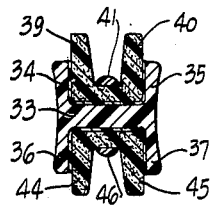
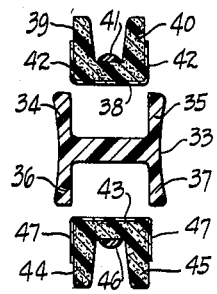
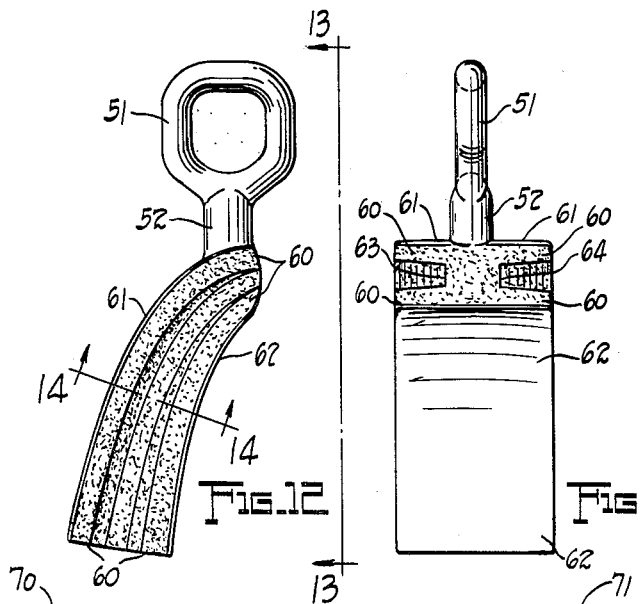
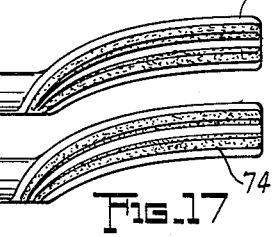
INVENTOR.
MYRON F. LEVENSON
BY Bosworth, Sessions,
Nerxstrom & Knowles
ATTORNEYS.

United States Patent Office 3,109,192
Patented Nov. 5, 1963

3,109,192
DEVICE FOR CLEANING TEETH
Myron F. Levenson, 5596 Mayfield Road,
Lyndhurst, Ohio
Filed Aug. 29, 1960, Ser. No. 52,741
7 Claims. (Cl. 15—210)

This invention relates to teeth cleaning devices utilizing sponge rubber, flexible plastic foam or similar porous materials to accomplish the cleaning action.

In addition to what is known to most people regarding the construction of ordinary toothbrushes, practically all of which depend for cleaning purposes on the presence of a multiplicity of bristles, it has heretofore been proposed, as in U.S. Patent 2,249,721 to Morris, to provide arcuate teeth cleaning devices formed with projections for entering into the interproximal spaces with a view to removing foreign matter from the teeth. Possibly because the conventional toothbrush, manufactured as it is on an extremely large scale, is relatively inexpensive to make, arcuate teeth cleaning devices have never achieved general public acceptance. Inasmuch as devices of this general type are usually described as exercisers, it is probable that most are less effective in cleaning the teeth than in exercising the gums.

The present invention has for one of its principal objects to provide a tooth cleaning device, preferably of arcuate shape, in which the tooth cleaning action results from the presence in the device of one or more masses of porous material that are adapted to come into intimate contact with the teeth. From tests using such devices, it has been found that the cleaning action is so nearly perfect that well masticated chewing gum, if used immediately following application of the tooth cleaning device, actually adheres to the teeth. In view of the fact that this does not happen following use of conventional tooth brushes, it is self-evident that an especially thorough cleaning action is provided. Although it can accurately be said that the tooth cleaning device of the present invention has a gum exercising function as well, this unusually effective tooth cleaning function is certainly the more important.

Another object of the invention is to provide a tooth cleaning device of this kind in and by which a dentifirice in liquid or paste form can be supplied through the body of the device itself to the space or spaces between juxtaposed masses of porous material.

Still another object of the invention is to provide a tooth cleaning device of the kind described which may be so simply and inexpensively produced that it may, if desired, be discarded as a throw-away after using it. According to this aspect of the invention, the device may be so constructed that part of the device, usually the porous material, may be removed, discarded and replaced at the whim of the user. In a different form of the invention, the device as a whole may be encased with porous material, in which case the entire device, rather than simply a part thereof, may be discarded when the user is satisfied that the purchase of another device of the same kind is warranted. In both cases, the fact that the device or a replaceable part thereof may be discarded without great financial loss makes it attractive from the replacement standpoint.

Other objects, advantages and features of the invention will be apparent from the description which follows and from the accompanying drawings, in which:

FIGURES 1 and 2 are, respectively, a top plan and a horizontal section through a first form of tooth cleaning device within the purview of the invention, the same being shown on an enlarged scale.

FIGURE 3 is a transverse section on line 3—3 of FIGURE 1.

FIGURE 4 is a side elevation as seen from line 4—4 of FIGURE 1.

FIGURE 5 is a vertical section on line 5—5 of FIGURE 1.

FIGURE 6 is a vertical section through a second form of tooth cleaning device with provision for forcing a dentifirice into the body of the device and thence into the spaces between juxtaposed masses of porous material.

FIGURE 7 is a transverse section on line 7—7 of FIGURE 6.

FIGURES 8 and 9 are, respectively, a top plan and a side elevation of a third form of tooth cleaning device in which the masses of porous material are replaceable.

FIGURE 10 is a transverse vertical section on line 10—10 of FIGURE 8.

FIGURE 11 is an exploded view corresponding to FIGURE 10 showing the replaceable elements to better advantage.

FIGURES 12 and 13 are, respectively, a top plan and a side elevation of a fourth form of tooth cleaning device.

FIGURE 14 is a transverse vertical section on line 14—14 of FIGURE 12.

FIGURE 15 is a transverse vertical section through a variant of the form shown in FIGURES 12 to 14 in which there is offseting of the upper and lower portions to allow for the offsetting which occurs in the human denture.

FIGURE 16 is a top plan of a child's tooth cleaning device that is double-ended but otherwise generally similar to that of FIGURES 1 to 5.

FIGURE 17 is a top plan of a child's tooth cleaning device in which the end portions extend at opposite angles to the longitudinal axis of the device.

Referring first to FIGURES 1 to 5, what is there shown is a tooth cleaning device designated 1 at one end of which is a removable handle 2 provided with a circular shoulder 3 and, projecting therefrom, an externally threaded shank 4. The latter is received in an internally threaded opening in the end stem 5 of an arcuate member 6 of generally H-shaped cross section: see FIGURE 3. The arcuate shape of member 6 conforms generally to the arcuate shape of the human denture. What appears in FIGURE 1 is that portion of the device which receives the righthand half of the upper set of teeth. In using the device, handle 2 and end stem 5 are held away from the face with the remainder of the device positioned in the side of the mouth between the upper and lower sets of teeth.

As appears from FIGURE 3, arcuate member 6 is H-shaped in the sense that it has on opposite sides thereof a first or upwardly extending pair of walls 7 and 8 which are more or less of the nature of parapets and a second or downwardly extending pair of walls 9 and 10 which likewise are of the nature of parapets. Both pairs of parapets are integral with the body portion of member 6. Projecting upward into the space separating parapets 7 and 8 is a shallow ridge 11 which is integral with and conforms to the arcuate contour of member 6. On the opposite side of member 6 a like ridge 12 projects downward into the space separating parapets 9 and 10. If, as in the preferred form of the invention, member 6 is of resilient material, ridges 11 and 12 develop a spring-back effect when subjected to the bite of the human mouth. This action is desirable in cleaning the teeth and also in exercising the gums.

Attached to the inside face of parapet 7 is a strip-like mass 13 of porous material. Attached to the inside face of parapet 8 is a strip-like mass 14. On the inside faces of parapets 9 and 10, respectively, are like masses 15 and 16. Strips 13, 14, 15 and 16 are fused by solvent-softening to the parapets with which they are severally associated; e.g., the parapets and strips are first subjected to the action of a mutual solvent and then pressed together. When the solvent evaporates, they weld together, thus providing a structure in which the strips are firmly attached to the parapets.

As appears from FIGURE 3, a V-shaped space 17 intervenes between strips 13 and 14; similarly, a V-shaped space 18 intervenes between strips 15 and 16. The teeth of the upper set enter into space 17; the teeth of the lower set, into space 18. If the user then employs a chewing motion, the result is to cause strips 13 and 14 to clean the inside and outside surfaces of the right-hand half of the upper set of teeth and simultaneously to cause strips 15 and 16 to clean the inside and outside surfaces of the right-hand half of the lower set of teeth. By reversing the device in the mouth, the left-hand halves of both sets may be cleaned in like fashion.

FIGURES 6 and 7 show a modified form of tooth cleaning device in which the several strips of porous material are held in place not as the result of solvent softening but as a result of the use of adhesive 19: see FIGURE 7. Arcuate member 6, instead of being solid, as in FIGURE 3, has a longitudinally extending passage 20 from which a number of lesser passages 21 branch off in a transverse direction. If a tube 22 of dentifrice in paste or liquid form is introduced into end stem 5 by causing the externally threaded portion 23 of the tube to engage the internally threaded portion of end stem 5, dentifrice may be forced from tube 22 into passages 20 and 21. From FIGURE 7 it will be apparent that the dentifrice will escape through passages 21 into the V-shaped openings between strips 13 and 14 on one hand and strips 15 and 16 on the other. By using tube 22 as a handle, the dentifrice may be supplied as needed while the tooth cleaning device is in use in the mouth.

In the form of the invention shown in FIGURES 8 to 11, both handle 31 and end stem 32 are formed integrally with arcuate member 33: see FIGURE 9. Walls 34 and 35, which as before are of the nature of parapets, extend upward from the body portion of member 33; similarly, walls 36 and 37, likewise of the nature of parapets, extend downward from the body portion of member 33. The channel-like spaces which intervene between parapets 34 and 35 and between parapets 36 and 37 preferably are square-cornered, as illustrated in FIGURE 11. They are so formed in order that they may accommodate square-cornered elements of porous material.

Upper element 38 is a generally channel-shaped piece of porous material characterized by upwardly extending side walls 39 and 40. Between the two side walls, at the base of the bight in element 38, a ridge 41 is cemented in place on the proximate face of the porous material of which element 38 is formed. A pressure-sensitive adhesive 42 covers those portions of element 38 that are expected to come into contact with arcuate member 33. By using a pressure-sensitive adhesive, upper element 38 may be inserted in and attached to arcuate body 33; when the time comes, it may be stripped therefrom to make room for a suitable replacement.

On the opposite or lower side of arcuate member 33 is a channel-shaped lower element 43 consisting of side walls 44 and 45, a ridge 46 that is similar to and held in place in the same fashion as ridge 42, and a pressure-sensitive adhesive 47 on those surfaces of lower element 43 that are expected to engage arcuate member 33. Like upper element 38, lower element 43 can be applied to arcuate member 33 by the pressure of the fingers. After it has served its purpose, it may be stripped off to make room for a replacement.

In the form of the invention shown in FIGURES 12 to 14, arcuate member 53, seen in FIGURE 14, is formed integrally with handle 51 and end stem 52. As in the case of all of the embodiments of the invention so far described, it is of H-shaped cross section, having a pair of upwardly directed walls 54 and 55 and a pair of downwardly directed walls 56 and 57. Ridges 58 and 59, which appear in FIGURE 14, are offset laterally from each other to corrsepond to the offset between the upper and lower sets of teeth of the normal human denture.

A sheath 60 of porous material completely enrobes arcuate member 53. Sheath 60 is preferably applied to member 53 by foaming a plastic material such as polyurethane in place in a suitably shaped form surrounding member 53. Where sheath 60 makes contact with the form, it develops surface skins 61 and 62: see FIGURE 13. The top and bottom surfaces of sheath 60 lack such skins as a result of having been trimmed to provide the generally square-cornered shape shown in FIGURE 14. The bights terminating in surfaces 63 and 64 are formed by cutting away the unwanted material.

FIGURE 15 shows a variant of the construction illustrated in FIGURES 12 to 14 in which the upper portion of the device is offset laterally in relation to the lower portion. Reference characters 53' to 64' correspond to those parts that in FIGURE 14 are identified by characters 53 to 64, respectively. It will be noted that walls 54' and 55' of arcuate member 53' are offset laterally in relation to walls 56' and 57'. Ridges 58' and 59' are centered in the upper and lower faces of the body portion of member 53' and therefore are offset from each other. As in the device of FIGURES 12 to 14, the offsetting of the ridges is intended to compensate for the offset found in the human denture.

FIGURE 16 shows a child's double-ended tooth cleaning device constructed along the same lines as the device shown in FIGURES 1 to 5 except that end portions 70 and 71 are connected by a central stem 72. If desired, end portion 70 may be used in the left-hand half of the mouth and end portion 71 in the right-hand half. If end portion 70 is used in the left-hand half of the mouth, end portion 71 will act as a handle; similarly, if end portion 71 is used in the right-hand half of the mouth, end portion 70 will serve as a handle.

In FIGURE 17 is illustrated a modification of the device shown in FIGURE 16 in which the two opposed end portions 73 and 74 extend at equal but opposite angles to the longitudinal axis of the device as a whole. End portions 73 and 74 are connected by a central stem 75. End portion 73 is for use in one side of the mouth; end portion 74, in the other. The device is intended to be rotated about its axis through an arc of 180° after being used in either half of the mouth, thus making the opposite end available for use in the other half of the mouth. As in the case of the tooth cleaning device of FIGURE 16, the construction of end portions 73 and 74 is substantially the same as the construction of the corresponding portions of the device shown in FIGURES 1 to 5, with FIGS. 10, 14 and 15 as variants.

In manufacturing the tooth cleaning device of the present invention, the arcuate member to which the porous material is applied may be made of cured or uncured natural rubber, synthetic rubber, nylon, a synthetic resin ("plastic"), or any other suitable material with an elongative capacity less than about 1½%. Young's modulus should be the range between 100,000 and 500,000 p.s.i. The arcuate member may vary widely in its other physical properties, having, if desired, a high measure of resilience coupled with a low measure of hardness, a low measure of resilience coupled with a high measure of hardness, or intermediate values for both. For the purposes of the invention, a suitable material will usually but not necessarily be one that is sufficiently rigid to permit of manufacture by injection molding techniques but flexible enough to yield under the impact of the jaws in the use of the device.

The porous material, whether taking the form of elongated strips permanently applied to the arcuate body, the form of detachable elements that may be discarded and replaced by similar elements, or the form of a sheath completely enrobing the arcuate body, should be spongy in nature, being made, for example, of sponge rubber, flexible foamed plastic such as silicone, polyurethane, or any similar suitable material. Preferably, the material that is used may conveniently be one that can be foamed in place, as explained in detail in conjunction with the tooth-cleaning device shown in FIGURES 12 to 14. The cellular construction may be either open or closed, as may be desired, although for most purposes an open cellular construction is believed to be preferable.

Variations in the form of the tooth cleaning device of the invention may be made without departing from the spirit of the invention. Thus the device may be shaped after the fashion of a horseshoe so as to correspond to the full human denture. In such event, it may be so formed as to operate only on the upper half or only on the lower half of the mouth, in which case the opposite face of the device may be free of any recess for the entry of the other set of teeth. In conjugated forms such as those shown in FIGURES 16 and 17, the conjugation may, if desired, be of other types than those shown with the parts connected together in different fashion from that illustrated in the drawings. In all of the various forms of the device, the portion intended for use as a handle may, if desired, be of almost any desired shape.

It is intended that the patent shall cover, by summarization in appended claims, all features of patentable novelty residing in the invention.

What is claimed is:

1. A device for cleaning teeth by mastication comprising a substantially solid body of non-porous material the shape of which conforms generally to the arcuate shape of the human denture; a pair of integrally formed parapets projecting upward from the lateral edges thereof; a pair of integrally formed parapets projecting downward from the lateral edges thereof, said downwardly projecting parapets being in substantial registry with said upwardly projecting parapets; one or more masses of porous material attached to the inside faces of said upwardly projecting parapets; and one or more masses of porous material attached to the inside faces of said downwardly projecting parapets, said body of non-porous material being of such limited deformability as to preclude substantial relative movement of said parapets when the device is in use.

2. A device according to claim 1 wherein the masses of porous material take the form of channels.

3. A device according to claim 1 wherein the masses of porous material take the form of juxtaposed strips.

4. A device according to claim 3 wherein the juxtaposed strips are separated by resilient ridges overlying and underlying said substantially solid body of non-porous material.

5. A device according to claim 4 wherein the ridges are longitudinal ridges extending generally parallel to the parapets.

6. A device for cleaning teeth by mastication comprising a resilient body of non-porous material the shape of which conforms generally to the arcuate shape of the human denture; a pair of integrally formed parapets projecting upward from the lateral edges thereof; a pair of integrally formed parapets projecting downward from the lateral edges thereof, said downwardly projecting parapets being in substantial registry with said upwardly projecting parapets; one or more masses of porous material attached to the inside faces of the upwardly projecting parapets; one or more masses of porous material attached to the inside faces of the downwardly projecting parapets; and, on opposite sides of said resilient body of non-porous material, resilient ridges for producing a spring-back effect when the device is subjected to the chewing action of the human mouth.

7. A device for cleaning teeth by mastication comprising a resilient body of non-porous material the shape of which conforms generally to the arcuate shape of the human denture; a pair of integrally formed parapets projecting upward from the lateral edges thereof; a pair of integrally formed parapets projecting downward from the lateral edges thereof, said downwardly projecting parapets being in substantial registry with said upwardly projecting parapets; one or more masses of porous material attached to the inside faces of the upwardly projecting parapets; one or more masses of porous material attached to the inside faces of the downwardly projecting parapets; and, on opposite sides of said resilient body of non-porous material, resilient ridges extending generally parallel to the parapets, said ridges producing a spring-back effect when the device is subjected to the chewing action of the human mouth.

References Cited in the file of this patent

UNITED STATES PATENTS

| | | |
|---|---|---|
| 1,818,146 | Maker | Aug. 11, 1931 |
| 2,761,166 | Connolly | Sept. 4, 1956 |
| 2,763,885 | Lyons | Sept. 25, 1956 |
| 2,783,491 | Bellam | Mar. 5, 1957 |

FOREIGN PATENTS

| | | |
|---|---|---|
| 546,136 | Great Britain | June 30, 1942 |